United States Patent [19]

Giordano

[11] 3,940,857

[45] Mar. 2, 1976

[54] CUT-OUT LOCATIONS MARKING METHOD, MEANS, AND METHOD OF FORMING SAID MEANS

[76] Inventor: Anthony J. Giordano, 19 Garfield Road, Wayne, N.J. 07470

[22] Filed: June 12, 1974

[21] Appl. No.: 478,786

[52] U.S. Cl. ............................. 33/189; 33/DIG. 10
[51] Int. Cl.² ........................................... G01B 3/00
[58] Field of Search ............ 33/180 R, 189, DIG. 10

[56] References Cited
UNITED STATES PATENTS

| | | | |
|---|---|---|---|
| 2,775,812 | 1/1957 | Mohr | 33/DIG. 10 |
| 2,898,688 | 8/1959 | Cottar | 33/197 X |

*Primary Examiner*—William D. Martin, Jr.
*Attorney, Agent, or Firm*—Thomas N. Neiman

[57] ABSTRACT

The methods and means are concerned with processes and devices useful in marking wallboard, paneling, and the like for the accurate definition of the limits of cut-outs to be formed to receive outlet boxes, switch boxes, and the like. In the preferred embodiment, the means comprise a substantially flat strip having a pair of spaced-apart cut-outs or recesses formed therein which, therebetween, define a triangular projection. Terminal, lateral portions of the strip are bent over upon themselves to define thereof a pair of resilient clips — the clips being resiliently receivable by walls of such outlet boxes, and switch boxes, and the like, to cause the projection to extend from the strip and box wall for marking of wallboard, paneling, and the like to denote the box wall location. To accommodate the marking means for engagement with wall junctures of the boxes, the means is bent transverse to an elongate axis thereof; accordingly, each clip engages a distinct wall of the box, and the projection extends from the wall juncture. The forming method sets forth the process of forming the novel marking means from a strip of material, and the locations marking method discloses a process of impressing cut-out location markings on wallboard, paneling and the like which, especially, can be practiced with the novel marking means.

7 Claims, 7 Drawing Figures

CUT-OUT LOCATIONS MARKING METHOD, MEANS, AND METHOD OF FORMING SAID MEANS

This invention pertains to methods of marking cut-out locations for outlet boxes, switch boxes, and the like, on wallboard, paneling, and the like, cut-out locating marking means, and methods of forming such marking means, and in particular to such methods and means which are useful in impressing only one, unitary and isolated marking on such wallboard, paneling, and the like.

Cut-out locations marking methods, means, and methods of forming such means are already known in the prior art and, particularly, U.S. Pat. No. 2,788,151, issued Apr. 9, 1957, to L. D. Shore, for Electrical Conduit Box Locator, and U.S. Pat. No. 2,887,776, issued May 26, 1959, to J. H. Eisner, for Template, are probably the more representative. Such prior devices and methods for their use function well, and accurately locate cut-out locations for outlet boxes, switch boxes, and the like.

The "Locator," according to the teaching of L. D. Shore, in the aforenoted U.S. Pat. No. 2,788,151, requires the fabrication of the conduit box, circuit box, or whatever, with the marking means integral therewith. Now, this presents two problems. For one, the circuit, conduit boxes have to be manufactured with the marking means, and this is not a desirable option from the marketing point of view. Also, it will not serve the homeowner who is working with installed, classic-type of circuit and conduit boxes. Further, the patentee's marking means comprise pointed "pins" which must be swung through an arc, for lodging in "openings," that they might project from the box. Now, it is to be expected that this manner of functioning will find the pins obstructed by wiring passed through slug holes in the box; at least, it requires that portions of the box be free of wiring so that the marking means can be put to their function. Too, it is required that the "pins" wholly penetrate the wallboard, paneling, etc., to receive an outlining template. The "Template" taught by patentee Eisner in his U.S. Pat. No. 2,887,776 will meet the general end purposes of the instant invention. It impresses locating markings for an outlet box, circuit box, or the like — i.e., for a box of particular size, shape or configuration, but not for another outlet or circuit box. Thus, for outlet, cirsuit, and switch boxes of differing dimensions and configurations, it is necessary to have separate and complementary "templates" for each thereof.

It is an object of this invention to overcome the limitations found in such prior art locating marking means, by setting forth an improved marking means, method of forming such marking means, and marking method.

Particularly it is an object of this invention to teach means for marking cut-out locations, for outlet boxes, switch boxes, and the like, on wallboard, paneling, and the like, comprising marker means, responsive to an engagement thereof with wallboard, paneling, and the like, for impressing a single, isolated marking on such wallboard, paneling, and the like whereat the latter and said marker means engage; and means for resiliently and releaseably clasping said marker means to an outlet box, switch box, and the like.

A feature of this invention comprises a substantially flat strip having a pair of spaced-apart cut-outs or recesses formed therein which, therebetween, define a triangular projection. Terminal, lateral portions of the strip are bent over upon themselves to define thereof a pair of resilient clips — the clips being resiliently receivable by walls of such outlet boxes, switch boxes, and the like, to cause the projection to extend therefrom for marking of wallboard, paneling, and the like to denote the box location.

Further objects and features of this invention will become more apparent by reference to the following description taken in conjunction with the accompanying figures, in which.

Figure 1:
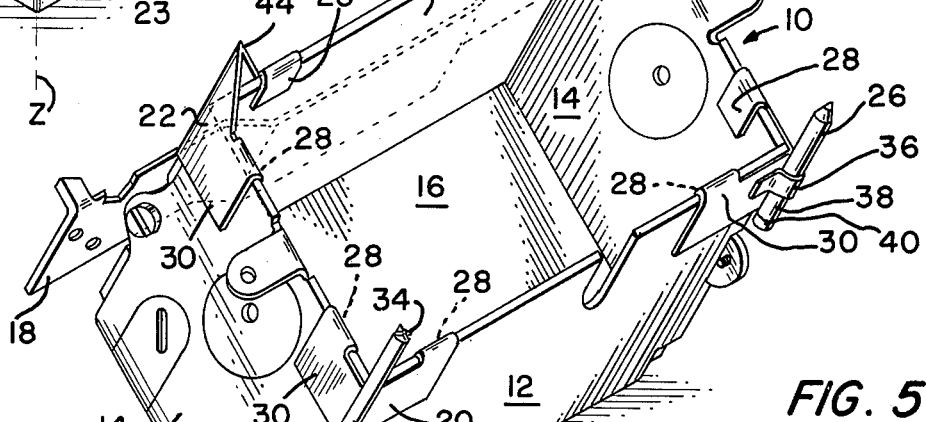
FIG. 1 is an isometric or perspective view of an electrical switch box onto the corners of which marking means according to the invention have been resiliently clasped. Four embodiments of the novel marking means are depicted.

As shown in FIG. 1, a typical switch box 10 is defined of side walls 12 and end walls 14, with a backing 16. A stud-mounting plate 18 is fixed to the box 10 to facilitate the mounting of the latter (according to practices well-known, and not germane to the instant invention).

Marking means 20, 22, 24, and 26, comprising the invention, are resiliently held in corners of the box 10, by tab portions 28 which are bent over to define resilient clips which clasp the walls.

Marking means 20 comprises a strip of material 30 which is bent transverse to the length thereof, substantially in a mid-location along an axis "Z—Z" (FIGS. 2, 3, 3A, 5, 6), to negotiate the right-angular corner. A marking pin 32 is fixed to the strip 30, for projection of an end thereof beyond the walls 12 and 14, the end 34 of the pin having a cross-cut formation.

Marking means 24 is substantially the same as marking means 20, except that in this embodiment a marking pin 32' is terminated in a sharp point 34'. Marking means 26 is similar to means 20 and 24, being formed of a strip 30 and tab portions 28. However, this embodiment of the invention includes a strap 36 fixed to the strip 30 for mounting a fiber-tip marking pen 38. Pen 38 comprises a replaceable cartridge which, by means of a threadedly-removable cap 40, can be withdrawn and supplanted with another.

Marking means 22 is one of the simpler forms of the invention. It is formed of a blank of strip material, as shown in FIG. 2, the material 30 having a pair of spaced-apart lateral cut-outs 42 formed therein — to define therebetween a triangular, pointed portion 44 at one end of axis Z—Z.

Figure 2:
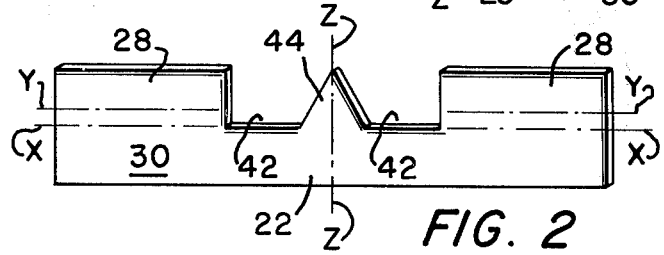
FIG. 2 is a top view of a flat strip of material, in slight perspective, which is the source blank for one of the marking means of FIG. 1.
Figure 3A:
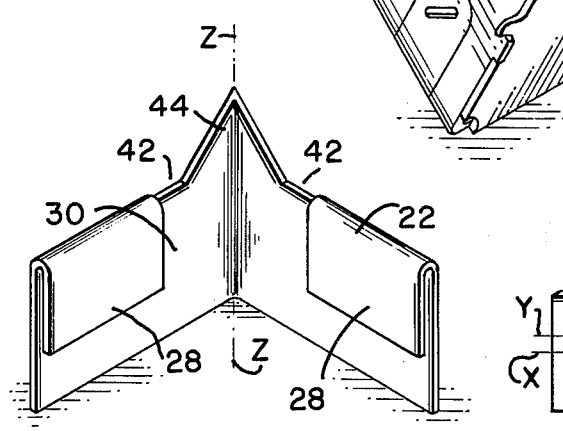
FIG. 3A is a view similar to FIG. 3, showing the strip or blank bent transverse to the normal axis thereof into a right-angular shape.
Figure 3:
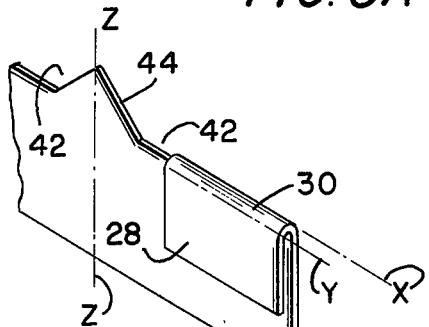
FIG. 3 is an isometric view of a fragment of the material strip or blank of FIG. 2, showing one tab portion bent into a clip configuration.

With reference to FIGS. 2 and 3, it can be seen that the enabling clips which secure the marking means 22 (and 20, 24 and 26) to the walls of the box 10 are defined by bending the tab portions 28 over into parallelism with the complementary portion of the material 30 along fold lines X and Y. If the marking means 22 is to be used in clasp of only a straight outlet box or circuit box wall, then nothing further need to be done to it. Where it is to be used to engage a corner of an electrical outlet box — as shown in FIG. 1, then it remains only to bend the material 30 along the axial fold line Z—Z.

Figure 4:
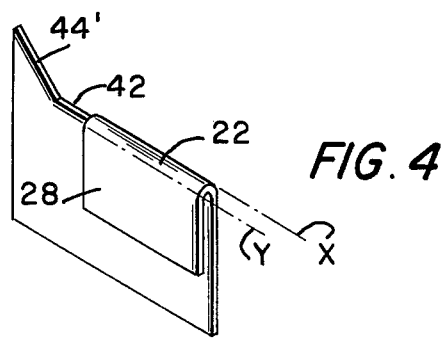
FIG. 4 is an isometric view of an alternate embodiment of the novel marking means, the same being substantially an axial half of the FIGS. 2, 3 and 3A embodiment.

FIG. 4 depicts a simpler version of marking means, the same being means 22' which is substantially a half of means 22. In some uses it will be found that such "half" marking means, having a narrower portion 44', will satisfy the wallboard, paneling, etc. marking.

Figure 6:
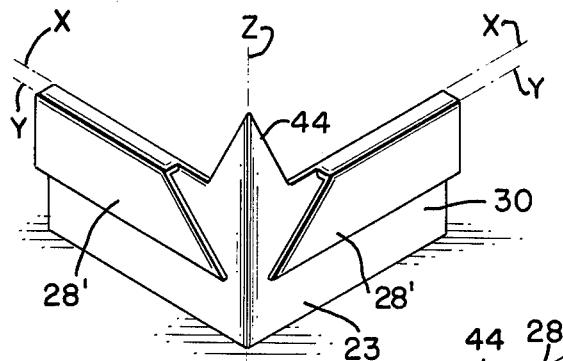
FIG. 6 is an operativel-conformed depiction of the FIG. 5 embodiment.
Figure 5:
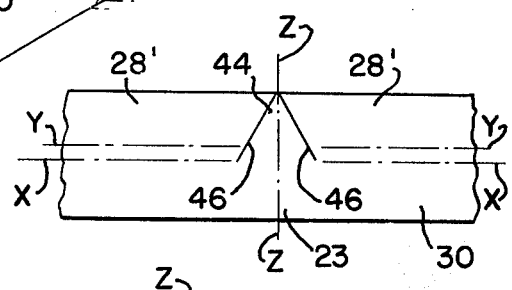
FIG. 5 is a plan view of an alternate embodiment, a further embodiment of the inventive marking means in source blank form.

FIGS. 5 and 6 illustrate a final embodiment of the invention, in marking means 23 which is not so unlike means 22 except that it yields no waste of the blank or material 30. Means 23 is formed by simply forming diverging/converging lateral cuts. Now, whereas the tab portions 28 of the prior embodiments are engaged with inside surfaces of the electrical box walls, means 23 employs tab portions 28' which engage the outside wall surfaces.

Each embodiment of my marking means offers a flexibility and utility not found in prior art markers. A deployment of any four of my marker means will impress the outline of any electrical box — regardless of the width and or length of the box. It is not necessary to have templates for each electrical box configuration and size. The embodiments 22 and 24 will likely find the most universal use for paneling and wallboard marking. Yet, as there are coverings which have speckling of sorts which may make it difficult to discern and locate the impressed markings — the indentations formed by marking means 22 and 24 — I have disclosed the alternate embodiments of means 20 and 26. The cross-cut formation in end 34 of pin 32 will leave a more distinctive marking and, if it is more desirable to deposit only a surface coloration, then the fiber-tip pen 38 carried in means 26 will serve this need.

As will be apparent to those skilled in this art, right-angularly-formed marking means of metal, plastic, and the like can be manufactured and supplied to the marketplace thus. Alternatively, pliant metal or composition blanks of material 30 can be provisioned in the fully flat formation as depicted in FIG. 2 (or with the tab portions 28 pre-bent, as shown in FIGS. 3 and 4) without a fold along axial fold line Z—Z. Thus, the user can elect to use the marking means on linear wall edges, or choose to bend the same along fold lines Z to shape the means for electrical boxes of whatever shape: round, hexagonal, etc.

The marking means 20, 22, and 24, of course, are used in the well-known manner. That is, the clips defined by the bent-over tab portions 28 are engaged with walls 12 and 14, at the juncture thereof — where it is desired to mark the corner of a switch box 10 (or the like). The same is done at all corners of the box, and then the paneling which is to be marked is aligned, for optimum installation, with the studs (or whatever) flooring, ceiling, etc., and positioned against the marking means-bearing switch box 10. Then, by impacting the paneling — by means of a mallet, or even by hand — in the general area whereat the switch box is known to be supported by stud or cross limb therebehind, the terminal ends of the marking means "bite" into the rear surfacing of the paneling to leave indicia of the outline of the switch box. Thereafter, of course, it remains only to cut out the material lying within the corner indicia to present an accurately-located cut-out or window for the switch box 10.

The use of marking means 26 is quite similar, except that it is not required to bite into the paneling surfacing with this embodiment of the invention. Rather, all one needs to do is to impress the rear surfacing of the paneling against the fiber-tip terminations of the corners-borne means 26 to deposit ink-dot indicia to denote the switch box outline.

As noted earlier, the novel marking means can be provisioned un-bent transverse the axis thereof; i.e., the same can be provisioned as shown in FIG. 3. Accordingly, the means of this type can be clipped to single walls of switch boxes (and the like); the same is true of the embodiment of FIG. 4. Further, if the circuit box, switch box, etc., is round, or hexagonal, the un-bent, straight type of marking means can be formed into obtuse angles, or be arcuately shaped, to engage such electrical boxes.

While I have described my invention in connection with specific embodiments thereof, it is to be clearly understood that this is done only by way of example and not as a limitation to the scope of my invention as set forth in the objects thereof and in the appended claims.

I claim:

1. In a means for marking cut-out locations, for wall-bounded outlet boxes, switch boxes, and the like, on wallboard, paneling, and the like, for use in combination with such outlet or switch boxes, and for use together with a plurality of said means for marking, in order that all said means for marking will impress discrete marks representative of an appropriate, geometric pattern of a cut-out, having a marker responsive to an engagement thereof with wallboard, paneling, and the like, for impressing only one, unitary, isolated mark on such wallboard, paneling, and the like whereat the latter and said marker engage; and means for resiliently and releaseably clasping said marker to an outlet box, switch box, and the like;

the improvement characterized in that said marker has an axis, and a marking end at one end of said axis; and said clasping means defines a clip of substantially U-shaped cross-section for axially receiving, and resiliently engaging, opposite sides of a selected portion of a wall of an outlet box, switch box, and the like; said clip opening opposite said one end of said axis, therein to receive a wall portion.

2. Marking means, according to claim 1, wherein: said marker comprises an element carried by said clip having a tapered and pointed termination.

3. Marking means, according to claim 2, wherein: said element, in cross-section, is of right-angular configuration.

4. Marking means, according to claim 2, wherein: said element, in elevation, is of triangular configuration.

5. Marking means, according to claim 1, wherein: said means for marking comprises a substantially flat, elongate strip having an elongate axis; and said clip comprises a portion of said strip bent over upon itself generally parallel with said elongate axis of said strip.

6. Marking means, according to claim 5, wherein:
a plurality of portions of said strip are bent over upon themselves, generally parallel with said axis, to define a plurality of U-shaped, resilient clips.

7. Marking means, according to claim 6, wherein:
said strip is bent, transverse to said axis, along an intermediate portion thereof.

* * * * *